United States Patent
Leistert

(10) Patent No.: US 11,047,415 B2
(45) Date of Patent: Jun. 29, 2021

(54) REAR-WALL INSERT WEDGE

(71) Applicant: Häfele Berlin GmbH & Co KG, Berlin (DE)

(72) Inventor: Peer Leistert, Schöneiche (DE)

(73) Assignee: HÄFELE BERLIN GMBH & CO KG, Berlin (DE)

( * ) Notice: Subject to any disclaimer, the term of this patent is extended or adjusted under 35 U.S.C. 154(b) by 653 days.

(21) Appl. No.: 15/939,259

(22) Filed: Mar. 28, 2018

(65) Prior Publication Data

US 2018/0283430 A1    Oct. 4, 2018

(30) Foreign Application Priority Data

Mar. 30, 2017    (DE) .................... 20 2017 101 856.3

(51) Int. Cl.
*F16B 12/12* (2006.01)
*A47B 47/04* (2006.01)
*F16B 12/24* (2006.01)

(52) U.S. Cl.
CPC ............ *F16B 12/12* (2013.01); *A47B 47/042* (2013.01); *F16B 12/24* (2013.01)

(58) Field of Classification Search
CPC .......... F16B 2/14; F16B 5/0614; F16B 12/20; F16B 12/32; A47B 47/0066; A47B 47/042; A47B 96/201; Y10T 403/42; Y10T 403/66; Y10T 403/7064; Y10T 403/7092; Y10T 403/7096; Y10T 403/73; Y10T 403/76; E04F 2201/0107; E04F 2201/05
USPC ................. 52/204.62, 204.64, 204.69, 204.7
See application file for complete search history.

(56) References Cited

U.S. PATENT DOCUMENTS

| | | | | |
|---|---|---|---|---|
| 3,388,517 A | * | 6/1968 | Wohl | ........................ E06B 3/62 |
| | | | | 52/204.591 |
| 4,067,155 A | * | 1/1978 | Ruff | ...................... E04B 1/6803 |
| | | | | 4/498 |
| 4,101,233 A | | 7/1978 | McConnell | |
| 4,744,612 A | | 5/1988 | Winter et al. | |
| 6,105,973 A | * | 8/2000 | Butler | ....................... E06B 3/62 |
| | | | | 277/644 |

(Continued)

FOREIGN PATENT DOCUMENTS

| | | | | |
|---|---|---|---|---|
| CH | 696 889 A5 | | 1/2008 | |
| DE | 3127631 A1 | * | 1/1983 | ........... E06B 3/5821 |

(Continued)

*Primary Examiner* — Amber R Anderson
*Assistant Examiner* — Alexus Camero
(74) *Attorney, Agent, or Firm* — Hackler Daghighian Martino & Novak

(57) ABSTRACT

An insert wedge is configured for fixedly clamping a first panel within a groove in a second panel. The insert wedge includes a square angle which has a broad limb and a wedge-like, narrow limb. A spring tongue is integrally formed on the outer side of the broad limb and extends by way of its free tongue end beyond the outer side of the narrow limb. The outer side of the narrow limb and the inner side of the broad limb may form an angle of 90°. The spring tongue may be inclined in relation to the inner side of the broad limb. The outer side of the narrow limb and the outer side of the spring tongue may form an angle of between 10° and 20°. The outer and/or inner side of the narrow limb and/or the outer side of the spring tongue may have projections.

23 Claims, 3 Drawing Sheets

(56) References Cited

U.S. PATENT DOCUMENTS

| | | | | |
|---|---|---|---|---|
| 6,581,342 B1 * | 6/2003 | Tavivian | ................. | B32B 17/10 |
| | | | | 156/106 |
| 7,958,682 B2 * | 6/2011 | Elzein | ..................... | E06B 5/12 |
| | | | | 52/204.53 |
| 8,590,228 B2 * | 11/2013 | Esposito | .................. | E06B 1/16 |
| | | | | 52/204.72 |
| 10,830,264 B2 * | 11/2020 | Dagand | ............... | E04F 11/1853 |

FOREIGN PATENT DOCUMENTS

| | | | | |
|---|---|---|---|---|
| DE | 32 18 551 A1 | | 11/1983 | |
| DE | 83 31 968 U1 | | 2/1984 | |
| DE | 299 07 723 U1 | | 6/2000 | |
| DE | 102 29 300 B3 | | 3/2004 | |
| DE | 20 2008 004145 U1 | | 8/2009 | |
| DE | 20 2008 006 607 U1 | | 10/2009 | |
| DE | 102013100352 A1 * | | 7/2014 | ............ F16B 12/125 |
| EP | 601421 A1 * | | 6/1994 | |
| GB | 2 256 894 A | | 12/1992 | |

* cited by examiner

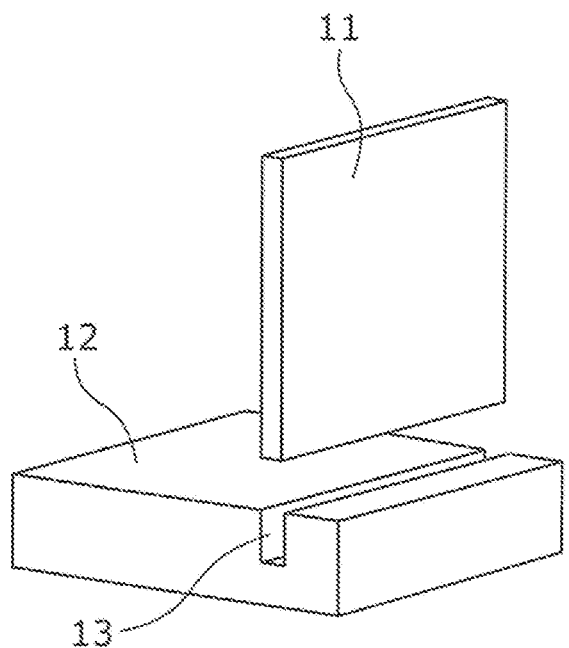
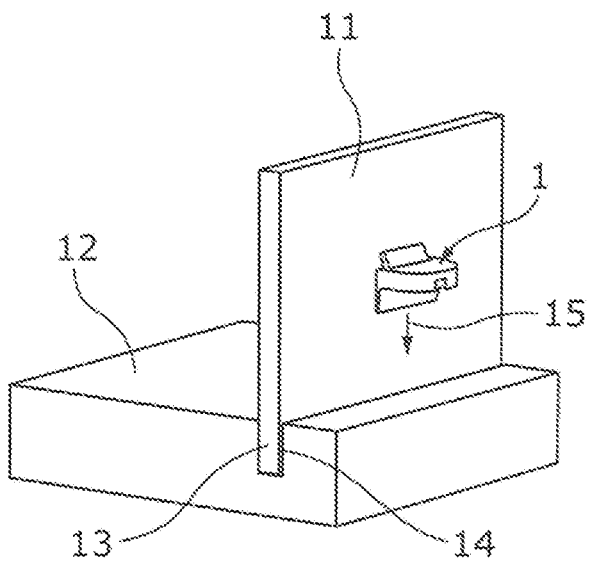
Fig. 2a
Fig. 2b
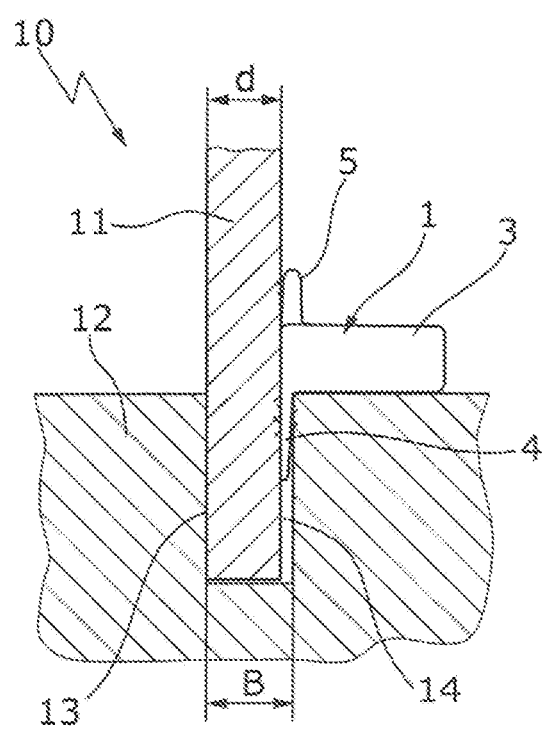
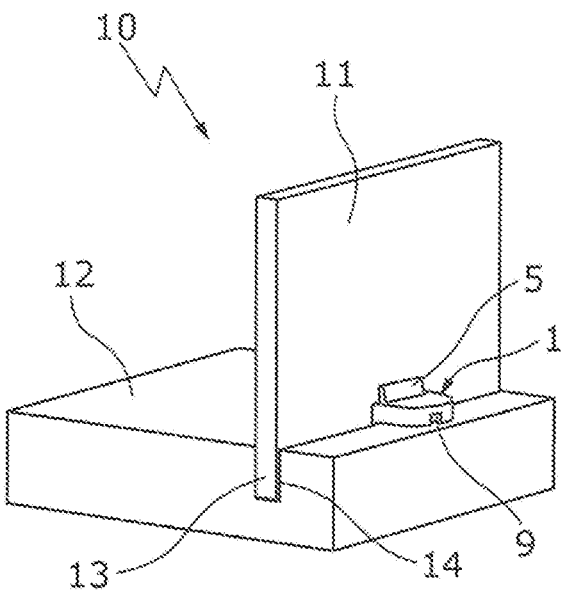
Fig. 2c
Fig. 2d

REAR-WALL INSERT WEDGE

CROSS-REFERENCE TO RELATED APPLICATIONS

This application claims priority to German Utility Model Application No. 20 2017 101 856.3 filed Mar. 30, 2017, the entire contents of which are hereby incorporated by reference.

DESCRIPTION

Field of the Invention

The invention relates to an insert wedge for fixedly clamping a first panel within a groove in a second panel, and also to an associated panel arrangement.

Background of the Invention

DE 83 31 968 U1 and DE 20 2008 006 607 U1 disclose rear-wall holders for fixing a rear-wall panel in position within a groove in a base panel, in which documents the rear-wall holder is anchored in the base panel and the rear-wall panel is screw-connected to the rear-wall holder by means of a screw.

SUMMARY OF THE INVENTION

In comparison, the invention is based on the object of fixing a first panel in position within a groove in a second panel in a simpler and more economical manner without tools.

According to the invention, this object is achieved by an insert wedge for fixedly clamping a first panel within a groove in a second panel, comprising a square angle which has a broad limb and a wedge-like, narrow limb, and comprising a spring tongue which is integrally formed on the outer side of the broad limb and extends by way of its free tongue end beyond the outer side of the narrow limb.

The insert wedge according to the invention can be produced in a simple and economical manner with a low level of expenditure on manufacture, for example from plastic or die-cast zinc, and fitted in an intuitive manner without tools.

The outer side of the narrow limb and the inner side of the broad limb preferably form an angle of 90°.

The spring tongue is preferably inclined in relation to the inner side of the broad limb, wherein the outer side of the narrow limb and the outer side of the spring tongue form an angle of between 70° and 80°, in particular of 75°. The spring tongue, by way of its outer side, preferably smoothly adjoins the outer side of the narrow limb.

The outer and/or inner side of the narrow limb and/or the outer side of the spring tongue particularly preferably have/has projections, for example in the form of sharp spikes, teeth, barbs, fluting, claws or ribs, in order to prevent the fitted insert wedge from being pulled out.

In order to increase the ability of the spring tongue to be elastically deflected in relation to the square angle, the narrow limb can have a slot, which is open to the outer side of the said narrow limb and runs parallel to the spring tongue, close to the transition region to the spring tongue.

The broad limb preferably has a cutout which is open to the inner side of the said broad limb and to the end side of the said broad limb, which end side is averted from the narrow limb, it being possible for a dismantling tool (for example a screwdriver) to be inserted into the said cutout.

The invention also relates to an arrangement comprising two panels which are connected to one another, the first panel from amongst the said two panels being inserted into a groove in the other, second panel, and comprising an insert wedge which is designed in the above manner, the wedge-like, narrow limb of the said insert wedge being pushed in a clamping manner into a gap, which is present within the groove when the first panel is inserted, until the broad limb bears by way of its inner side against the second panel, and the spring tongue of the said insert wedge being straightened and pressed against the first panel. For a clamping effect, the groove width of the groove is greater than the panel thickness of the first panel by at most the width of the narrow limb. In this arrangement according to the invention, the two panels are fixed to one another with a high degree of angular stability.

In order to achieve a stronger clamping effect, the groove width can be chosen to be greater than the panel thickness of the first panel by less than the width of the narrow limb.

For the purpose of exactly prespecifying the position, the second panel can have a bore which is, in particular, open to the groove, a pin of the insert wedge, which pin projects from the inner side of the broad limb, engaging in the said bore in a precise position.

Further advantages of the invention are evident from the description, the claims and the drawing. Similarly, the features mentioned above and those that will be presented further can be used in each case by themselves or as a plurality in any desired combinations. The embodiments shown and described should not be understood to be an exhaustive enumeration, but rather are of exemplary character for outlining the invention.

BRIEF DESCRIPTION OF THE DRAWINGS

In the drawings:

FIGS. 2a-2d show the fitting of the rear-wall insert wedge according to the invention;

DETAILED DESCRIPTION OF THE PREFERRED EMBODIMENTS

Figure 1A:
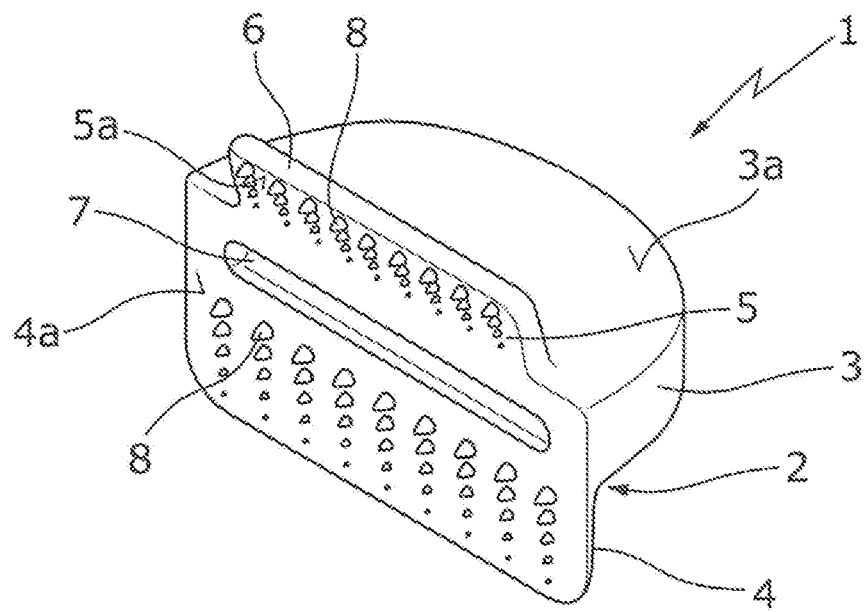
FIGS. 1a, 1b show a perspective view (FIG. 1a) and a side view (FIG. 1b) of a first embodiment of the rear-wall insert wedge according to the invention.
Figure 1B:
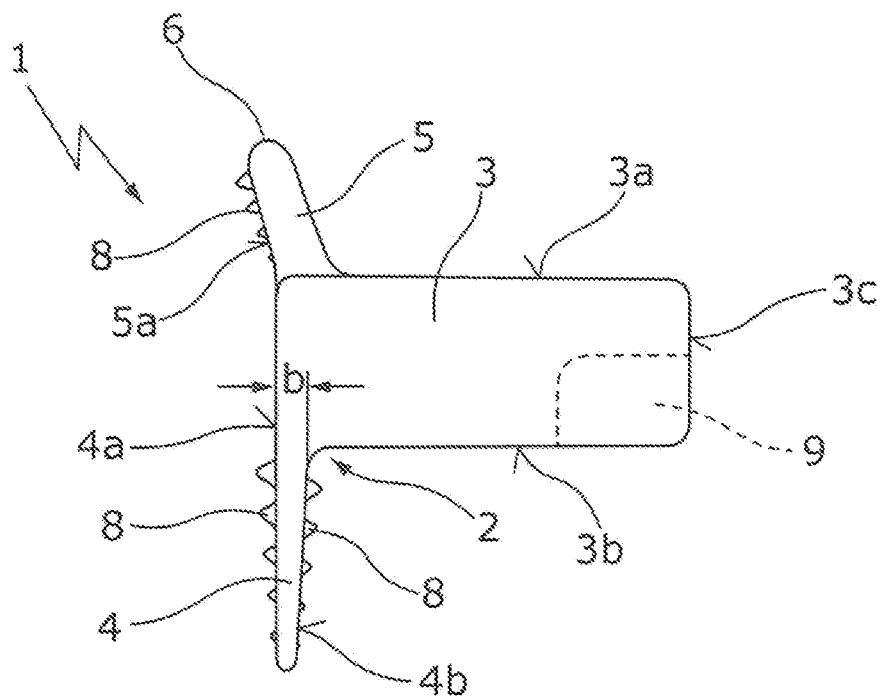

The rear-wall insert wedge ("rear-wall holder") 1 shown in FIG. 1 serves to fixedly clamp a first panel within a groove in a second panel and is integrally formed, for example, from plastic or die-cast zinc.

The insert wedge 1 comprises a square angle 2 having a relatively broad limb 3 and having a wedge-like, relatively narrow limb 4, and also comprises a spring tongue 5 which is integrally formed on the outer side 3a of the broad limb 3 and extends by way of its free tongue end 6 beyond the outer side 4a of the narrow limb 4. The narrow limb 4 and the spring tongue 5 are each in the form of a continuous wall. The inner side 3b of the broad limb 3 and the outer side 4a of the narrow limb 4 form an angle of 90°, wherein the outer side 3a of the broad limb 3, as in the exemplary embodiment shown, can run parallel to the inner side 3b of the broad limb 3, but does not have to. The wedge angle which is formed between the outer and inner sides 4a, 4b of the narrow limb is between 2° and 5°, preferably approximately 3°.

The spring tongue 5 is inclined in relation to the inner side 3b of the broad limb 3. In this case, the outer side 5a of the spring tongue 5 steplessly adjoins the outer side 4a of the narrow limb 4 and forms an angle of between 70° and 80°, preferably of approximately 75°, together with the inner side 3b of the broad limb 3. The narrow limb 4 has a slot 7, which is open to the outer side 4a of the said narrow limb and runs parallel to the spring tongue 5, close to the transition region to the spring tongue 5 in order to increase the ability of the spring tongue 5 to be elastically deflected in relation to the square angle 2.

The outer and inner sides 4a, 4b of the narrow limb 4 and also the outer side 5a of the spring tongue 5 have spike-like projections 8, the lengths of the said spike-like projections in each case decreasing in the direction of the free limb end and, respectively, of the free tongue end 6. Furthermore, a cutout 9 which is open to the inner side 3b of the said broad limb and to the outer side 3c of the said broad limb, which outer side is averted from the narrow limb 4, is provided in the broad limb 3.

FIGS. 2a-2d show the fitting of the insert wedge 1 for fixedly clamping a rear-wall panel 11 within a groove 13 in a base plate 12. The rear-wall panel 11 is inserted into the groove 13 in the base plate 12 (FIG. 2a), the groove width B of the said groove being greater than the panel thickness d of the rear-wall panel 11 by at most the width b of the narrow limb 4. As a result, a gap 14 remains when the rear-wall panel 11 is inserted in the groove 13, the gap width of the said gap corresponding at most to the width b of the narrow limb 4 (FIGS. 2b, 2c) and possibly being, for example, approximately 1 mm. The insert wedge 1 is pushed into this gap 14 in a clamping manner by way of its wedge-like, narrow limb 4 in arrow direction 15 until the broad limb 3 bears by way of its inner side 3b against the base plate 12 (FIGS. 2c, 2d). In the process, the spring tongue 5 is straightened and pressed against the rear-wall panel 11. The rear-wall panel 11 is therefore fixedly clamped in the groove 13 by the wedge-like, narrow limb 4 and additionally stabilized by the spring tongue 5 which is pressed against the said rear-wall panel. The projections 8 of the narrow limb 4 dig into the rear-wall panel 11 and into the groove flank of the groove 13, and the projections 8 of the spring tongue 5 dig into the rear-wall panel 11, so that the insert wedge 1 and therefore the entire arrangement 10 is fixed in position.

For dismantling purposes, the insert wedge 1 can be levered out of the gap 14 against the insertion direction 15 by means of a screwdriver which is inserted into the cutout 9.

Figure 3:
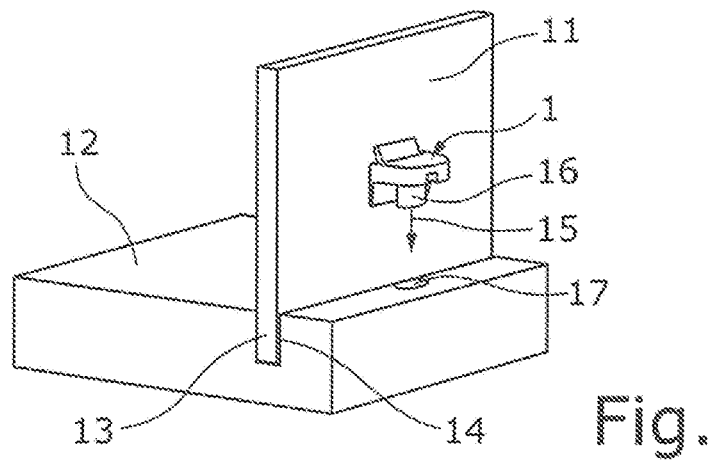
FIG. 3 shows the arrangement shown in FIG. 2b with a modified rear-wall insert wedge.

In FIG. 3, the insert wedge 1 is positioned by means of an integrally formed pin 16 which projects downwards in the insertion direction 15 on the broad limb 3 and engages into a bore 17—which is, in particular, open to the groove 13—in the base plate 12.

Instead of being designed as flat walls as in FIG. 1, the narrow limb 4 and/or the spring tongue 5 can also be designed as walls with a corrugated cross section which can then be pressed flat in the clamped-in state.

Figure 4:
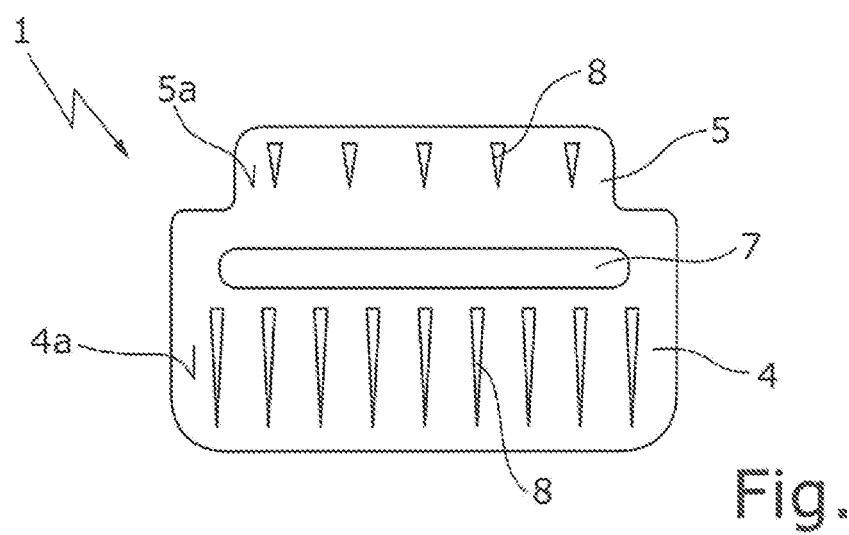
FIG. 4 shows a front view of a second embodiment of the rear-wall insert wedge according to the invention.

Instead of being designed as sharp spikes as in FIG. 1, the projections 8 can also be designed as teeth, barbs, fluting, claws, or, as shown in FIG. 4, as vertical ribs which are designed, merely by way of example here, in the form of equilateral acute triangles each with a downwardly directed point. In each case, the projections 8 prevent the insert wedge 1 from being pulled out of the gap 14 and prevent the rear-wall panel 11 from being pulled out of the base plate 12.

Figures 5A, 5B:
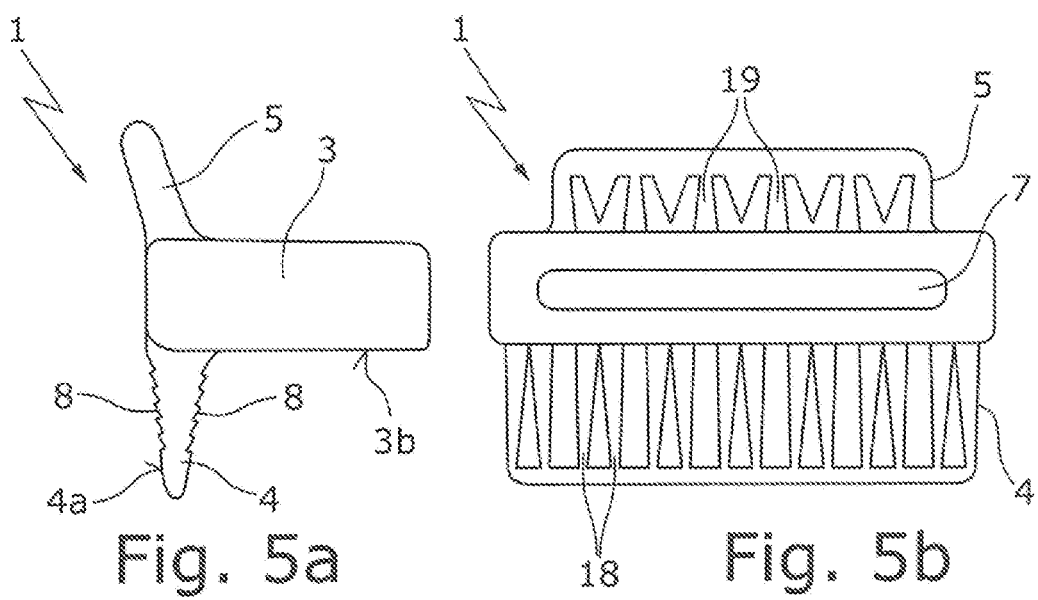
FIGS. 5a, 5b show a side view (FIG. 5a) and a front view (FIG. 5b) of a third embodiment of the rear-wall insert wedge according to the invention.

The insert wedge 1 shown in FIGS. 5a, 5b differs from the insert wedge 1 of FIG. 1 in that the narrow limb 4 and the spring tongue 5 are not formed as continuous walls here, but rather are each formed by a series of spaced-apart vertical struts 18, 19, and in that the projections 8 are formed by teeth of the vertical struts 18, 19. In addition, the inner side 3b of the broad limb 3 and the outer side 4a of the narrow limb 4 form an angle of less than 90°, preferably in the range of between 80° and 85°.

What is claimed is:

1. An insert wedge configured for fixedly clamping a first panel within a groove in a second panel, the insert wedge comprising:
    a square angle which has a broad limb and a wedge-like, narrow limb; and
    a spring tongue which is integrally formed on an outer side of the broad limb and extends by way of its free tongue end beyond an outer side of the narrow limb;
    wherein the narrow limb has a slot, which is open to the outer side of the said narrow limb and runs parallel to the spring tongue, close to a transition region to the spring tongue.

2. The insert wedge according to claim 1, wherein the outer side of the narrow limb and an inner side of the broad limb form an angle of 90°.

3. The insert wedge according to claim 1, wherein the spring tongue is inclined in relation to the inner side of the broad limb.

4. The insert wedge according to claim 1, wherein the outer side of the spring tongue smoothly adjoins the outer side of the narrow limb.

5. The insert wedge according to claim 4, wherein the outer side of the narrow limb and the outer side of the spring tongue form an angle of between 10° and 20°.

6. The insert wedge according to claim 1, wherein the outer and/or inner side of the narrow limb and/or the outer side of the spring tongue has projections.

7. The insert wedge according to claim 1, wherein the broad limb has a cutout which is open to the inner side of the said broad limb and to the outer side of the said broad limb, which outer side is averted from the narrow limb.

8. The insert wedge according to claim 1, wherein the outer side of the narrow limb and/or the outer side of the spring tongue forms a flat or a corrugated contact area.

9. The insert wedge according to claim 1, wherein the narrow limb and/or the spring tongue are/is in the form of a solid wall or are/is formed by a series of spaced-apart vertical struts.

10. The insert wedge according to claim 1, wherein the broad limb has a protruding pin on its inner side.

11. An arrangement comprising two panels which are connected to one another, the first panel from amongst the said two panels being inserted into a groove in the other, second panel, and comprising an insert wedge according to claim 1, wherein the wedge-like, narrow limb of the said insert wedge is pushed in a clamping manner into a gap, which is present within the groove when the first panel is inserted, until the broad limb bears by way of its inner side against the second panel, and the spring tongue of the said insert wedge is straightened and pressed against the first panel, wherein the second panel has a bore which is, in particular, open to the groove, a pin of the insert wedge, which pin projects from the inner side of the broad limb, engaging in the said bore.

12. The arrangement according to claim 11, wherein a groove width of the groove is larger than a panel thickness of the first panel by at most the width of the narrow limb.

13. The insert wedge according to claim 4, wherein the outer side of the narrow limb and the outer side of the spring tongue form an angle of 15°.

14. An insert wedge configured for fixedly clamping a first panel within a groove in a second panel, the insert wedge comprising:
   a square angle which has a broad limb and a wedge-like, narrow limb; and a spring tongue which is integrally formed on an outer side of the broad limb and extends by way of its free tongue end beyond an outer side of the narrow limb;
   wherein the broad limb has a cutout which is open to the inner side of the said broad limb and to the outer side of the said broad limb, which outer side is averted from the narrow limb.

15. The insert wedge according to claim 14, wherein the outer side of the narrow limb and an inner side of the broad limb form an angle of 90.

16. The insert wedge according to claim 14, wherein the spring tongue is inclined in relation to the inner side of the broad limb.

17. The insert wedge according to claim 14, wherein the outer side of the spring tongue smoothly adjoins the outer side of the narrow limb.

18. The insert wedge according to claim 17, wherein the outer side of the narrow limb and the outer side of the spring tongue form an angle of between 10 and 20.

19. The insert wedge according to claim 14, wherein the outer and/or inner side of the narrow limb and/or the outer side of the spring tongue has projections.

20. The insert wedge according to claim 14, wherein the narrow limb has a slot, which is open to the outer side of the said narrow limb and runs parallel to the spring tongue, close to a transition region to the spring tongue.

21. The insert wedge according to claim 14, wherein the outer side of the narrow limb and/or the outer side of the spring tongue forms a flat or a corrugated contact area.

22. The insert wedge according to claim 14, wherein the narrow limb and/or the spring tongue are/is in the form of a solid wall or are/is formed by a series of spaced-apart vertical struts.

23. An insert wedge configured for fixedly clamping a first panel within a groove in a second panel, the insert wedge comprising:
   a square angle which has a broad limb and a wedge-like, narrow limb; and a spring tongue which is integrally formed on an outer side of the broad limb and extends by way of its free tongue end beyond an outer side of the narrow limb;
   wherein the broad limb has a protruding pin on its inner side.

* * * * *

UNITED STATES PATENT AND TRADEMARK OFFICE
CERTIFICATE OF CORRECTION

PATENT NO. : 11,047,415 B2
APPLICATION NO. : 15/939259
DATED : June 29, 2021
INVENTOR(S) : Peer Leistert Page 1 of 1

It is certified that error appears in the above-identified patent and that said Letters Patent is hereby corrected as shown below:

In the Claims

Column 5 In Claim 15, Line 23, insert --°-- after "90".

Column 6 In Claim 18, Line 3, insert --°-- after "10" and "20".

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*